Jan. 25, 1938.    W. A. BLACK    2,106,338
FLYWHEEL CLUTCH MECHANISM
Filed Aug. 31, 1935    2 Sheets-Sheet 1
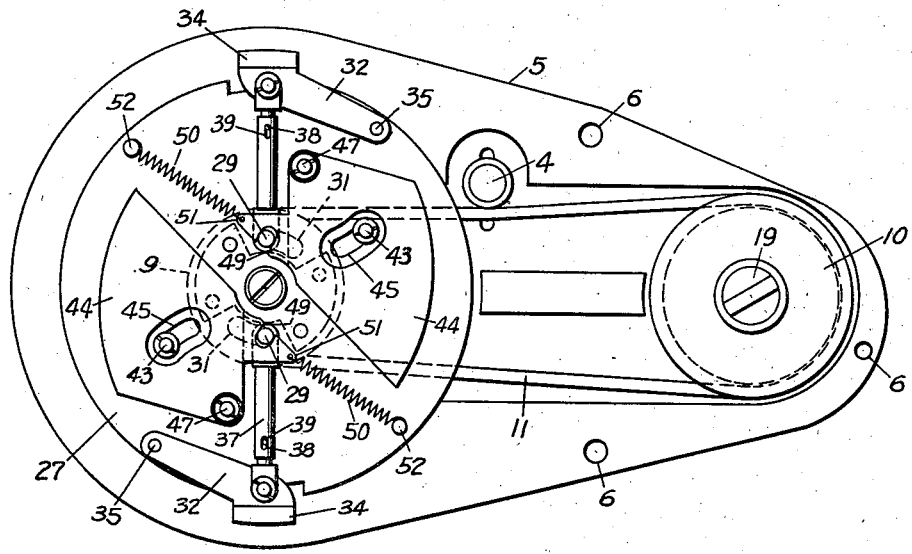
FIG_1
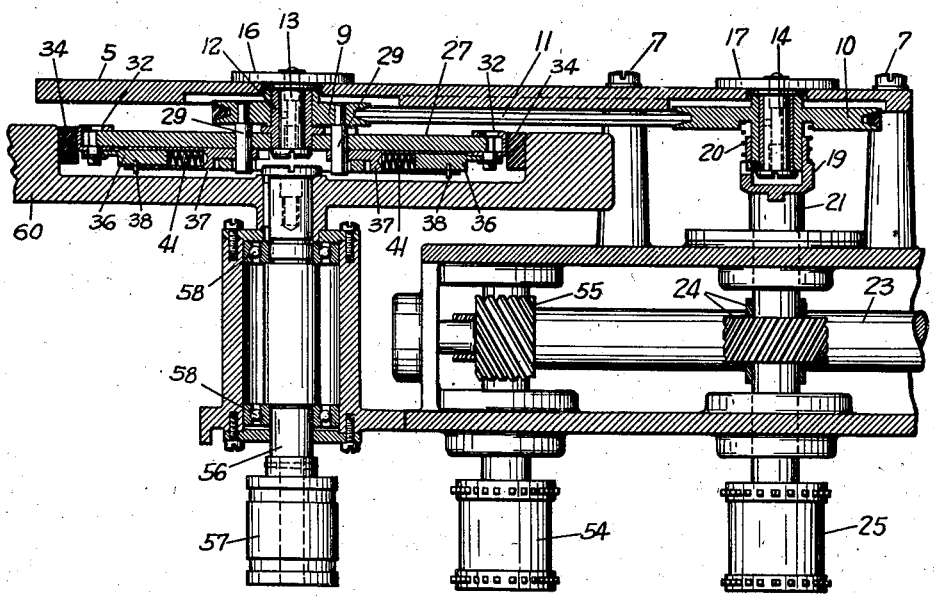
FIG_2
INVENTOR
William A. Black
BY
ATTORNEY Jan. 25, 1938.  W. A. BLACK  2,106,338
FLYWHEEL CLUTCH MECHANISM
Filed Aug. 31, 1935  2 Sheets-Sheet 2
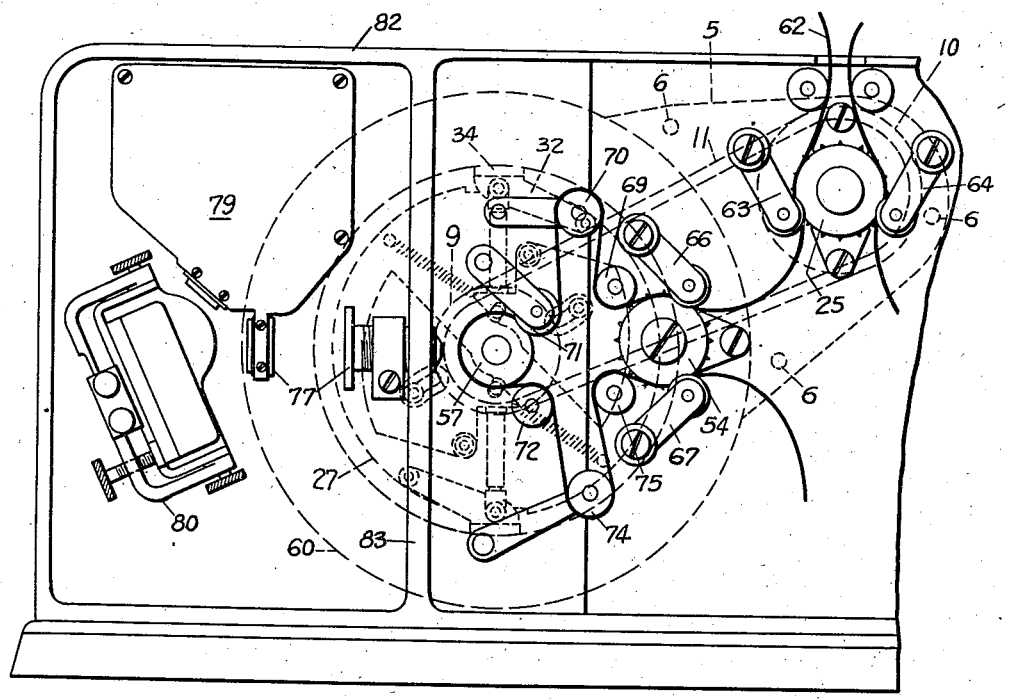
FIG_3
INVENTOR
William A. Black
BY
ATTORNEY Patented Jan. 25, 1938

2,106,338

UNITED STATES PATENT OFFICE 2,106,338

FLYWHEEL CLUTCH MECHANISM

William A. Black, Montclair, N. J., assignor to United Research Corporation, Long Island City, N. Y., a corporation of Delaware Application August 31, 1935, Serial No. 38,737

12 Claims. (Cl. 271—2.3)

This invention relates to film driving mechanism and particularly to an automatic clutch whereby a stabilizing element, such as a flywheel rotated by the pull of the film during operation, is driven directly by the motor during starting and acceleration.

In continuous film driving apparatus such as sound recording and reproducing units, it is necessary that the film be advanced past the point of contact between a light beam and the film, known as the translation point, at a constant uniform speed in order to obtain undistorted sound during reproduction. This uniform film speed is generally obtained by the use of a flywheel directly connected to a film roller at or adjacent the translation point. The film is pulled over the roller by a continuously rotating drive sprocket, the film serving as a belt for rotating the flywheel.

In such a film drive arrangement, the inertia of the flywheel is sufficiently large to prevent its being brought up to speed within a reasonable time, such as the period of time it requires a film leader to pass the translation point, solely by the film pull since the film slips over the flywheel roller. This slippage is also damaging to the film and should the film be pressed so tightly on the roller during starting that slippage does not occur, then damage is very probable through torn sprocket holes or complete breakage of the film.

It is desirable, therefore, and almost necessary that some additional means for driving the flywheel during the acceleration period be provided and the present invention is directed to a device for automatically making a direct connection between the motor and flywheel during this period. After the flywheel has once acquired its running speed, the device automatically disconnects or releases the flywheel thus permitting it to be further driven solely by the film pull.

The principal object of the invention, therefore, is to automatically connect a flywheel to the film driving means during acceleration of the mechanism and to automatically disconnect the flywheel from its driving mechanism when uniform speed of the apparatus is attained.

Other objects of the invention and the details thereof will be more fully understood by reference to the following description read in conjunction with the accompanying drawings, in which Fig. 1 is an elevational view of an interconnecting unit before attachment to sound recording or reproducing apparatus.

Fig. 2 is a cross-sectional view of the unit shown attached to a sound recording unit; and Fig. 3 is a front elevational view of a portion of the recording apparatus showing the film path.

Referring to the figures, in which the same numerals indicate identical elements, a mounting plate 5 has holes 6 drilled therein for mounting the unit to the sound apparatus by means of screws 7. V-shaped pulleys 9 and 10 are interconnected by a belt 11 and mounted to rotate upon bearings 13 and 14 fixedly attached to the plate 5 by means of collars 16 and 17, respectively. An idler 4 adjustable in a groove of the plate 5 serves to control the tension of the belt 11.

The pulley 10 is rotated in an anti-clockwise direction by means of a collar 19 urged outwardly by a coil spring 20, the engagement being provided by the insertion of a projection of the sleeve 19 into a slot in a shaft 21 driven by a motor shaft 23 through spiral gears 24, the shaft 21 also having a feed sprocket 25 mounted thereon.

The pulley 9, driven by the belt 11, rotates a disc 27 in an anti-clockwise direction by means of pins 29 fixedly attached to pulley 9. The pins 29 are inserted in slots or curved elongated holes 31 in the disc 27, thus permitting independent motion between the pulley 9 and disc 27 within the limits of the slots 31. This independent motion is accomplished by having a sleeve 12 extend over and rotatable on shaft 13 to which disc 27 is attached while pulley 9 is free to rotate on sleeve 12 within the limits of the slots. At diametrically opposite points on the outer edge of the disc 27 are U-shaped members 32 carrying contact friction shoes 34 of suitable composition, the U-shaped members 32 extending over the edge of the disc 27 and having arms extending along the outer portion of the disc to points 35 where they are pivotally attached to the disc.

The members 32 are also connected to rods 36 which project within sleeve members 37 and are maintained adjustably therein by means of pins 38 attached to rods 36 and inserted in elongated holes 39. Coil springs 41, within the sleeves 37, urge the rods 36 outwardly which in turn urges the friction shoes 34 to their extreme positions with respect to the sleeves 37. These sleeves are pivoted on pins 29 and thus connected to the pulley 9.

Also mounted on the disc 27 and movably guided over the surface thereof by countersunk pin and washer combinations 43 attached to the disc, are segmental inertia elements 44 similar to the inertia elements of a centrifugal governor. The elements 44 have slots 45 therein so that the elements 44 may rotate about pivots 47 which fasten the elements 44 to the disc, within the limits of the slots 45. Notches 49 in the elements 44 are fitted over the pins 29 so that actuation of the members 44 to their outward positions will actuate the sleeves 37 and consequently move the friction shoes 34 toward the center of the disc 27. This is because the sleeves as shown in Fig. 1, with shoes 34 extended, are along radii of the disc 27 and when shifted so that the lower end remains at the same distance from the center of the disc, must necessarily draw the shoes inwardly. The members 44 are attached to coil springs 50 at points 51, the other ends of the springs being fastened at points 52 to the disc 27. This spring tension is such as to urge the members 44 in a direction to position the friction shoes 34 at their extreme outward positions. It will be noted that the pins 29 abut the sides of the notches when the shoes 34 are in their extended positions and thus any pressure by the pins against the notches urge the shoes 34 to their extended positions.

The apparatus just described, as shown in Fig. 1, is an individual unit which may be attached to or removed from a sound unit such as a sound recorder, portions of which are shown in Figs. 2 and 3 and will now be described. The shaft 23 mentioned above is driven by a motor, the shaft being connected to the feed sprocket 25 through spiral gears 24. A drive sprocket 54 is also driven by the shaft 23 through spiral gears 55. This drive sprocket 54 pulls the film over a roller 57 on a shaft 59 which rotates in ball bearings 58. A stabilizing flywheel 60 is mounted on the other end of shaft 56 and is undercut to accommodate a portion of the mechanism shown in Fig. 1.

Referring now to Fig. 3, the path of a film 62 is shown passing the feed sprocket 25 having pad rollers 63 and 64 associated therewith, over drive sprocket 54 having pad rollers 66 and 67 associated therewith, under an idler roller 69, over a tension roller 70, over the flywheel roller 57 having a pressure roller 71 associated therewith, over an idler roller 72, under a tension roller 74, over an idler roller 75, under drive sprocket 54 from which it may pass through any suitable identifying mechanism or directly back to the feed sprocket 25. The translation point at which the light contacts the film is on the roller 57, the light being projected thereon through optical units 77, the light originating from a light source in the compartment 79 and modulated by a galvanometer 80, this galvanometer being of the type disclosed and claimed in co-pending application Serial No. 20,923 filed May 11, 1935. This apparatus is mounted within a casing 82 having a light-proof dividing wall 83.

The operation of the above-described automatic clutch mechanism combined with the sound recording unit, as shown, is as follows: The unit of Fig. 1 is mounted by means of the plate 5 and screws 7 to the frame of the sound unit, the sleeve 19 connecting the pulley 10 with the shaft 21. This attachment is so designed that the rotation of the disc 27 is on an axis concentric with the axis of the roller and flywheel shaft 56, although the coil springs 41 in the sleeves 37 permit a certain eccentricity from interfering with the operation of the clutch. The springs 41 also limit the radial pressure of the shoes against the flywheel as well as cushion the contacts therebetween. At the position of rest, the springs 50 extend the sleeves 37 so that the friction shoes 34 contact the inner surface of the cut away portion of the flywheel. Upon energization of the motor, the belt 11 drives the pulley and pins 29 which bear against the sides of the notches in the members 44 thus aiding the springs to force the shoes against the flywheel and maintain them in this position. The greater the acceleration, therefore, the greater will be the pressure of the shoes against the flywheel which is particularly desirable to prevent slippage at increased accelerations. The disc, shoes, and flywheel are thus rotated together as a unit.

When acceleration of the flywheel has ceased, however, the pressure of pins 29 against members 44 decreases to zero since there is no reaction from the shoes 34. During acceleration, potential energy was stored in members 44 by the tangential force on the shoes 34 since the members 44 were prevented from moving outwardly. When this energy is released by the removal of this tangential force, the members 44 swing outwardly and withdraw the friction shoes 34 from the flywheel and thus disconnect the drive and permit the flywheel to be driven solely by the film 62 passing over the roller 57. The releasing of the energy speeds the flywheel slightly faster than the disc 27 but the flywheel drops back to normal within a revolution or so. Centrifugal force continues to maintain the shoes out of contact with the flywheel until the speed of the mechanism has been reduced to nearly zero.

The present mechanism is adapted to operate at different speeds within certain limits, that is, it is not necessary to design a unit for any one particular rotational speed. In fact the same unit has operated satisfactorily at speeds ranging from 240 to 360 R. P. M. without adjustment. By varying the mass of members 44 and the tension of springs 50 various speed ranges of operation may be obtained. This result is partially accomplished by the particular design of the unit, such as the positions of the pivots for the elements 32 on the disc 27 and the position or arrangement of the notches 49 which contact the pins 29 attached to the pulley 9. This arrangement permits the accelerating forces to react upon the members 44 through the pins 29 and as long as acceleration exists or the flywheel is under its required speed, the shoes 34 remain connected to the flywheel and become disengaged only when the flywheel has attained its required uniform speed.

What is claimed is:

1. Film advancing apparatus comprising a drive shaft, means for driving said shaft, film advancing sprockets driven by said drive shaft, a roller over which film is advanced by said sprockets, a flywheel integrally connected to said roller, and means interconnecting the shaft of one of said sprockets and said flywheel, said means being adapted to drive said flywheel during acceleration thereof and to instantly release said flywheel when uniform speed thereof is attained, said flywheel being driven thereafter by said film at the speed of said flywheel when released.

2. Film advancing apparatus in accordance with claim 1 in which said means comprises a pair of radially movable friction members adapted to contact said flywheel during acceleration and be instantly disengaged therefrom at uniform speeds of said flywheel.

3. In a film drive mechanism the combination of a drive sprocket, a roller adapted to be rotated by film pulled thereover by said sprocket, an inertia means directly connected to said roller for stabilizing the rotation thereof, a motor for driving said sprocket, means directly connected to said motor and adapted to be rotated at the same speed as said roller, said means comprising a governor controlled clutch having friction shoes adapted to engage said inertia means during acceleration thereof and to disengage said inertia means when said inertia means attains uniform rotational speed, the disengaging of said friction means slightly accelerating the rotation of said inertia means.

4. Film drive apparatus comprising a pair of interconnected rotational members, a drive shaft, means for directly connecting one of said members to said shaft, film advancing sprockets driven by said shaft, a shaft having said other member mounted thereon to rotate substantially concentrically with said first-mentioned member, a driven element for stabilizing the advancement of film and mounted concentrically with said other member and driven thereby when a predetermined angular displacement exists between said members, weight members attached to said other member, and radially extending friction members carried by said other member and adapted to connect said other member to said driven element for directly driving said element, said friction members being adapted to make contact when extended and to disengage when said free shaft has reached a uniform speed.

5. A film drive apparatus in accordance with claim 4 in which the connection between said rotational members includes pins fixedly attached to said first-mentioned member and inserted in elongated slots in said other member, the position of said weight members and friction members being determined by the position of said pins in said slots.

6. A film drive apparatus for connecting a film drive element with a film stabilizing element comprising film advancing sprockets, a film pulled element, a mounting plate, a pair of pulleys adapted to rotate adjacent the terminals of said plate and physically interconnected, a motor adapted to rotate said elements, and sprockets, means for connecting said motor to one of said pulleys, a disc concentrically mounted with respect to the other of said pulleys, a plurality of pins physically attached to said other pulley and mounted in elongated slots in said disc for driving said disc when the pins are adjacent one end of said slots, weight members mounted on said disc and attached to said pins, said weight members adapted to move away and toward the axis of said disc, and radially extending members mounted on said disc and attached to said pins, said radial members being extended and said weight members being maintained toward said axis when said pins are in position to drive said disc from said pulley.

7. Film advancing apparatus for a film drive system comprising the combination of a power shaft for advancing film, an auxiliary shaft for stabilizing the advancement of said film, a fly wheel coupled to said auxilary shaft, and a clutch between said power shaft and said auxiliary shaft, said clutch comprising inertia members maintained inoperative as long as said flywheel is being accelerated or as long as said flywheel is under its required speed to maintain the coupling between said power shaft and said auxiliary shaft, said inertia members operating to disconnect said power shaft from said auxiliary shaft only when said flywheel has attained its required uniform speed, said uniform speed being the same as the speed at the time of disconnection.

8. In a system for driving a flexible film and for stabilizing the advancement thereof, the combination of a drive shaft, means connected to said drive shaft for advancing said film at a substantially uniform rate, a driven shaft adapted to be rotated by a connection between said means and said driven shaft through said film, and means interconnecting said drive shaft and said driven shaft adapted to remain mechanically connected thereto during acceleration of said driven shaft and to instantaneously be disconnected therefrom at the instant said driven shaft has attained a uniform speed, said uniform speed remaining the same as at the time of disconnection.

9. A film advancing and stabilizing system comprising the combination of a drive shaft, a sprocket connected thereto for advancing film, a roller having a mass associated therewith for stabilizing the advancement of said film, said roller being rotated by the pull of said film from said sprocket, and a clutch mechanism for directly connecting said drive shaft with the shaft of said roller, said clutch mechanism comprising means utilizing the inertia of said mass for mechanically connecting said mass and said drive shaft, and means controlling said contacting means utilizing centifugal force for disengaging said mass from said drive shaft when said mass has reached a uniform speed, said uniform speed remaining the same as at the time of disengagement.

10. Film advancing apparatus for a film drive system comprising a drive shaft, sprockets driven by said shaft for advancing film, a film pulled element, a flywheel connected to said film pulled element for stabilizing the advancement of said film thereover, a pair of friction shoes rotatably driven by said drive shaft, and a pair of weight members operably connected to said friction shoes, said friction shoes being adapted to contact said flywheel during acceleration thereof and of said shoes, said acceleration preventing operation of said weight members, said weight members being adapted to operate to disconnect said friction shoes from said flywheel when said flywheel or friction shoes reach a uniform speed within predetermined limits.

11. Film advancing apparatus comprising a plurality of film advancing sprockets, a film pulled element, a flywheel associated with said film pulled element to stabilize the advancement of said film thereover, a drive shaft for driving said sprockets, a pair of pulleys, one of said pulleys adapted to be connected to said drive shaft, the other of said pulleys adapted to be driven by said first pulley, a member concentrically rotatable with respect to said second pulley and independent thereof within certain predetermined rotatable limits, friction means mounted on said member for radial extension therefrom, and means of predetermined mass mounted on said member for controlling the radial extension of said friction means at uniform rotational speeds within predetermined limits.

12. Film advancing apparatus comprising a drive shaft, a plurality of film advancing sprockets driven by said shaft, a film pulled shaft having a film roller at one end thereof and a flywheel at the other end thereof, and a mechanism interconnecting said drive shaft with said film pulled shaft at predetermined times, said interconnecting mechanism comprising a rotatable member continuously connected and driven by said drive shaft, a second rotatable member mounted to rotate concentrically and adapted to be driven by said first rotatable member after a predetermined angle of displacement exists therebetween, friction means mounted on said second rotatable member and adapted to be radially extended for direct connection with said flywheel, resilient means interconnecting said friction members and said rotatable members for absorbing shocks due to connection therebetween, and inertia means for controlling the extension of said friction means, said inertia means operating only when said rotatable members have reached a uniform speed within certain predetermined limits.

WILLIAM A. BLACK.